United States Patent Office 3,745,135
Patented July 10, 1973

3,745,135
POLYMERIZED ETHYLENICALLY UNSATURATED FATTY ACIDS AS EMULSIFIERS FOR AQUEOUS DISPERSIONS
Gerfried Pruckmayr, Media, Pa., assignor to E. I. du Pont de Nemours and Company, Wilmington, Del.
No Drawing. Filed Aug. 17, 1970, Ser. No. 64,595
Int. Cl. C08d 9/14; C08f 21/04
U.S. Cl. 260—23 EM                11 Claims

ABSTRACT OF THE DISCLOSURE

Aqueous dispersions of oils, waxes, resins which are liquid at the temperature at which the dispersion is formed, and inorganic particulate materials, such as metal oxides, are prepared utilizing a polymerized ethylenically unsaturated fatty acid as a surface active agent. These dispersions are storage-stable and are insensitive to pH changes caused by the presence of polyvalent inorganic anions, such as phosphates and borates.

BACKGROUND OF THE INVENTION

Field of invention

This invention relates to aqueous dispersions and processes for their preparation and more particularly to the use of polymerized ethylenically unsaturated fatty acids as surface active agents in the preparation of aqueous dispersions of oils, waxes, resins and inorganic particulate materials such as metal oxides, clays, and pigments.

Prior art

Aqueous dispersions can be used in a variety of ways, e.g., as adhesives, coatings, binders, etc. For many of these uses, different combinations of water-dispersible materials are employed to provide the best results for a given end-use. However, oftentimes the most desirable materials for a given end-use may not form satisfactory storage-stable dispersions. To reduce the tendency of many aqueous dispersions to coalesce during preparation or upon storage, surface active agents are incorporated therein.

For many possible combinations of water-dispersible materials, surface active agents which will provide good storage-stable aqueous dispersions are sought. For example, a desirable combination of water-dispersible materials is diammonium phosphate and an ethylene/vinyl acetate binder system. A good dispersion of these ingredients could be used to provide a flame-proofing or fire-retardant dispersion which could be applied to textile fibers and fabrics. Accordingly, it would be desirable to have an effective surface active agent which will provide good storage-stable aqueous dispersions of water-dispersible materials containing diammonium phosphate or other inorganic anions as well as to have an effective surface active agent for particulate solid materials compatible with these dispersions.

SUMMARY OF THE INVENTION

According to the present invention, there is provided a storage-stable aqueous dispersion comprising as essential ingredients at least one water-dispersible material which is essentially insoluble in water and is selected from the group consisting of an oil, a wax, a resin which is a liquid at the temperature at which the dispersion is formed, and an inorganic particulate solid material; and from about 0.5 to 50 weight percent, based on the total weight of essential ingredients, of a polymerized ethylenically unsaturated fatty acid as a surface active agent neutralized with a water-soluble base.

These dispersions can further comprise at least one polyvalent inorganic anion selected from the group consisting of inorganic phosphates and borates when increased flameproofing or fire-retardant characteristics are desired.

Accordingly, there is provided an effective surface active agent which will provide good storage-stable dispersions containing oils, waxes, resins, inorganic particulate solid materials, and inorganic anions selected from the group consisting of inorganic phosphates and borates.

There is also provided a process for preparing a storage-stable aqueous dispersion comprising agitating in water at least one dispersible material which is essentially insoluble in water and is selected from the group consisting of a liquid having a boiling point greater than 150° C., a wax, a resin which is a liquid at the temperature at which the dispersion is formed, and an inorganic particulate solid material in the presence of from about 0.5 to 50 weight percent, based on the total weight of said dispersible material, of a polymerized ethylenically unsaturated fatty acid as a surface active agent neutralized with a water-soluble base.

DETAILED DESCRIPTION OF THE INVENTION

The aqueous dispersions of the present invention are prepared by dispersing in water as essential ingredients an oil, wax, resin and/or inorganic particulate solid material; and from about 0.5 to 50 weight percent, based on the total weight of essential ingredients, of a polymerized neutralized ethylenically unsaturated faty acid as a surface active agent. Several preferred dispersions utilizing polybasic fatty acids as surface active agents are dispersions of ethylene/vinyl acetate copolymers, dispersions of chlorinated hydrocarbons, dispersions of inorganic metal oxides, such as antimony trioxide, and mixtures thereof.

The polybasic fatty acids of this invention are insoluble in water and accordingly are neutralized with a water-soluble base to form the corresponding soaps. It is preferred that the base be at least one-water-soluble base selected from the group consisting of an alkali metal base and an ammonium base. Preferred alkali metals are sodium and potassium. Preferred bases are the hydroxides, although other soluble bases, such as the carbonates and bicarbonates, can also be used. The amount of base present in the dispersion must be sufficient to insure adequate surface active agent during emulsification. It is preferred that the total amount of base be about equal to that stoichiometrically required to neutarlize the polybasic fatty acid. However, the presence of excess amounts of base, e.g., up to about 25 percent above the stoichiometric amount required to neutralize the acid, does not detract form the emulsifying action of the acid. It is preferred that the polybasic fatty acid neutralized with alkali metal base be present in the dispersion in an amount of at least 0.5 weight percent, based on the total weight of essential ingredients, to insure the presence of neutralized acid in the dispersion at all times.

The surface active agents contemplated by this invention are the polymerized ethylenically unsaturated fatty acids. These are conventional fatty acids known to those skilled in the art. Examples of such commercially available fatty acids are dimer acid, e.g., dimerized linoleic acid, trimer acid, e.g., trimerized linoleic acid, and blends thereof, such as Empol 1010 (a product of Emery Industries, Inc. having a typical composition of 97 percent dimer acid and 3% trimer acid), and Empol 1040 (a product of Emery Industries, Inc. having a typical composition of 5% dimer acid and 91% trimer acid. It is preferred to use $C_{16}$–$C_{18}$ fatty acid monomers in this invention; and most preferred to use at least one fatty acid monomer selected from the group consisting of oleic, linoleic, linolenic, and ricinoleic acid. It is also preferred that the polymerized ethylenically unsaturated fatty acid be a dimerized or trimerized fatty acid. Polymerization can be accomplished by conventional methods known to those skilled in the art. The amount of polybasic fatty acid present in the dispersion is from about 0.5 to 50, preferably 1 to 30, and most preferably 3 to 20, weight percent, based on the total weight of essential ingredients.

The material which is dispersed with the aid of the polybasic fatty acid surface active agent may be any of a wide variety of oils, waxes, resins or inorganic particulate solid materials which are essentially insoluble in water, i.e., soluble to an extent of no more than 20 grams/liter of water at 25° C. It is not necessary, but rather preferable, that the polymerized polybasic ethylenically unsaturated fatty acid be incompatible or insoluble in the oil, wax, resin or inorganic particulate solid material at room temperature.

An oil as defined for use in this invention is any liquid which is essentially insoluble in water and has a boiling point greater than 150° C. at atmospheric pressure. Suitable oils for dispersing according to the practice of this invention can be of animal, vegetable, mineral or synthetic origin. Illustrative, but not limiting, of these classes of material would be lard and lanolin; olive oil, cottonseed oil, castor oil, linseed oil, tung oil, soybean oil and pine oil; mineral oil, paraffin oil, coal tar and asphalt; silicone oils and dibutyl phthalate.

The waxes suitable for the practice of this invention can also be of natural, mineral, petroleum or synthetic origin. Natural waxes include beeswax, woolwax, Japan wax, myrtle, mace, palm kernel, spermaceti, carnauba, candelilla, bayberry; mineral waxes include materials such as montan wax and paraffin waxes from shale oils or coal; petroleum waxes include both the paraffin and microcrystalline type; and synthetic waxes include halogenated hydrocarbons, e.g., chlorinated paraffins, polyethylene wax, alpha-olefin waxes, and Fischer-Tropsch waxes.

The waxes which are benefited most in this invention are the paraffin waxes of petroleum origin. These materials are normally very difficult to convert into stable aqueous dispersions without downgrading many of their inherent desirable properties. These waxes are mixtures of solid hydrocarbons derived from the overhead wax distillate fraction obtained from the fractional distillation of petroleum. After purification, the paraffin wax contains hydrocarbons that fall within the formula $C_{23}H_{48}$ to $C_{35}H_{72}$. The waxes are hard, colorless and translucent materials having melting points generally in the range from about 120 to 200° F., preferably 120 to 180° F.

Preferred chlorinated paraffin waxes are the chlorinated, saturated hydrocarbons of the $C_{10}$ to $C_{30}$ range having a chlorine content of 40 to 70% as described by Hardie, "Chlorinated Hydrocarbon," in 5 Encyclopedia of Chemical Technology 231 (Kirk-Othmer, 2nd ed., 1964). Depending upon their chlorine content, these chlorinated paraffins have melting points from −30° C. (42% chlorine) to 90° C. (70% chlorine). They can be dispersed either by the direct dispersing process or the indirect dispersing process as hereinafter described.

There are also numerous materials broadly classified as resins which can be converted into aqueous dispersions by the practice of this invention. Certain limitations apply to suitable resins in addition that they must be essentially insoluble in water. The resins must either be liquids, have a melting or a softening point below the dispersing temperature, or else be soluble in water-immiscible solvents. The phrase "resin which is a liquid at the dispersing temperature" means any of these, i.e., a resin which itself is a liquid or has a melting or softening point below the dispersing temperature, or a liquid solution of the resin in a water-immiscible solvent. When solvents are not employed, the minimum dispersing temperature is about 80° C., whereas the maximum dispersing temperature is fixed by the pressure limitations of the dispersing equipment or by hydrolysis of the components at the elevated temperatures. The liquid resin or molten solid resin must have a viscosity below 5000 cps. as determined at the dispersing temperature employed. Resinous materials which can be dispersed by the practice of this invention are the various petroleum hydrocarbon resins, rosin and rosin-derived resins, epoxy resins, terpene resins, coumaroneindene and derived resins, styrene and styrene copolymer resins, polyamide resins, polyester resins and phenolic resins.

When water-immiscible solvents are employed, high melting and high viscosity waxes and resins can be dispersed. The oil, wax or resin together with 0.5 to 50 percent of the polybasic fatty acid is dissolved in a suitable solvent. The viscosity of the resulting polymer solution must be below 5000 cps. and preferably in the range of 100 to 200 cps. With this modification, high molecular weight polymers, e.g., polyethylene and ethylene copolymers including polymers comprising about 30 to 95 weight percent copolymerized ethylene and about 5 to 70 weight percent of copolymerized units of at least one comonomer having polar characteristics can be dispersed. Typical ethylene copolymers are ethylene/propylene copolymers, ethylene/vinyl acetate copolymers, ethylene/methyl methacrylate copolymers, ethylene/vinyl acetate/acrylic acid copolymers, and ethylene/vinyl acetate/methacrylic acid copolymers. Preferred copolymers are an ethylene/vinyl acettae copolymer of 18 to 40 weight percent vinyl acetate and an ethylene/vinyl acetate/acrylic or methacrylic acid copolymer of 0.5 to 10 weight percent acid content and 18 to 40 weight percent combined vinyl acetate and acid content.

Inorganic particulate solid materials such as metallic oxides, clays, pigments and fillers can be dispersed according to the practice of this invention. These materials are useful for many purposes. For example, when the formation of a flameproofing composition is desired, metallic oxides, such as antimony trioxide, antimony pentoxide, zinc oxide, ferric oxide, stannic oxide, and manganese dioxide, are preferably employed. It is generally accepted that antimony trioxide is by far the best metallic oxide for flameproofing compositions and is therefore the most preferred material. It is preferred that the particulate solid material be a fine particle grade in which all of the particles are less than 1 micron in diameter. Storage stable dispersions of such particulate solid materials are preferably prepared by combining the solid material with 0.5 to 50 percent by weight of a partially or completely neutralized polybasic fatty acid under conditions of high-shear by the direct dispersing process as hereinafter described. These dispersions are also stable to pH changes caused by the addition of polyvalent inorganic anions thereto as shown, hereinafter, in Example 2.

Polyvalent inorganic anions can also be included in the dispersions of this invention. Suitable polyvalent inorganic anions are selected from the group consisting of inorganic borates and phosphates, e.g., ammonium borate, ammonium phosphate, and diammonium phosphate. Suitable borates and phosphates will be obvious to one skilled in the art. These anions are useful in forming compositions having improved fire-retardant properties, e.g., capable of preventing afterglow in impregnated textiles.

The dispersing operation of this invention is preferably carried out in high-shear equipment. Preferred dispersing machines are a "Kady" mill manufactured by the Kinetics Dispersion Corporation of Buffalo, N.Y., which has been specially modified for pressure operation, and "Eppenbach Dispersor" manufactured by the Gifford-Wood Company of New York, N.Y., and a "Hockmeyer Discpersor" manufactured by the Big "H" Equipment Corp. of New York, N.Y. This operation can be carried out in either a continuous or a batch manner; however, due to mechanical difficulties, a batch-type process is preferred. Anyone skilled in the art can readily adapt this equipment to a continuous process.

These dispersions can be prepared by any process known in the art. The two preferred processes are (a) a direct dispersing process using no auxiliary solvents and (b) an indirect dispersing process using auxiliary or water-immiscible organic solvents.

The direct process is basically very simple. The material to be dispersed, together with the polybasic fatty acid as the surface active agent, water and the desired amount of water-soluble base are added to a Kady mill. The relative quantities of material to be dispersed and water are chosen to give as high an oil phase volume percent as practical, which is usually in the range of 65 to 75 percent. The mill vessel is then closed up and if desired steam may be applied to the jackets on the vessel to heat the contents as rapidly as possible. The mill is turned on, and the high energy of mixing also tends to heat the material rapidly. A pressure head of nitrogen or air may be maintained in the vessel to prevent boiling. Generally, 10 to 30 lbs. pressure of nitrogen above that of the water vapor pressure in the vessel may be maintained. This corresponds to a pressure of about 25 to 75 p.s.i.g. When the contents reach 100 to 110° C. it is necessary to switch from steam to cooling water in the jackets in order to control temperature due to the high-mixing energy input of the mill. For most materials 5 minutes of milling in the temperature range of 130 to 140° C. is adequate. The product can then be cooled and discharged. Frequently, cold water is added to the hot product in order to serve the double purpose of cooling rapidly below 100° C. so that it can be discharged without frothing and also to dilute the material to the desired solids concentration range, generally 50 to 65 percent.

The indirect process utilizing polybasic fatty acids as surface active agents uses a water-immiscible organic solvent to dissolve both the polybasic fatty acid and the oil, wax or resin. While the organic solvent mixture can consist solely of a hydrocarbon or a halogenated hydrocarbon solvent, preferably the solvent mixture consists of a mixture of hydrocarbon solvent and a polar substance such as an aliphatic alcohol. Such solvent mixtures and methods of preparing dispersions are described in detail in U.S. Pat. 3,296,172 issued Jan. 3, 1967 to Dennis L. Funk and Vernon C. Wolff, the disclosure of which is incorporated by reference. In the present invention, the preferred solvent combinations are benzene or cyclohexane with either normal propyl alcohol or isopropyl alcohol. The ratio of hydrocarbon to the polar liquid is chosen to be close to that of the ratio present in the ternary azeotrope of hydrocarbon/alcohol/water. The combined amounts of the ethylene copolymer and the oil, wax or resin is such that the resulting solution has a viscosity between 10 and 5000 centipoises and preferably in the range of 100 to 200 centipoises as measured at the dispersing temperature.

Hydrocarbon solvents or halogenated hydrocarbon solvents are one component of the water-immiscible solvent system. By "water-immiscible solvent" is meant one having a solubility in water of less than about one weight percent at processing temperatures. Since the solvents are evaporated off after formation of the dispersion, it is preferable to use a solvent which is easily removed. Generally, solvents are employed which have boiling points less than about 150° C. at 760 millimeters pressure. Illustrative of other hydrocarbon solvents are toluene, the xylenes, tetrachloroethylene, methylene chloride and the fluorinated and chlorofluorinated alkanes such as the "Freons."

Examples of polar liquids which can be employed are alcohols, ketones and amides such as methyl ethyl ketone, cyclohexanone and dimethylformamide. Preferred are the alkyl alcohols having 1 to 4 carbon atoms. The polar liquid should comprise 5 to 60 percent by weight of the solvent mixture and will vary depending upon the particular combination of polar liquid and hydrocarbon solvent chosen. For example, when benzene and isopropyl alcohol are employed, the isopropyl alcohol should comprise 20 to 35 percent by weight of the mixture.

After the resulting emulsion is formed, the solvents are removed by evaporation. This evaporation can be accomplished by any of the well-known techniques in the art, using either vacuum, atmospheric, or pressure conditions. The evaporation is continued after the solvent is removed to prepare aqueous dispersions having a higher solids content on the order of 50 to 65 percent by weight of solids.

The uses for dispersions of this invention are very numerous. Examples include wax coatings on paper, foil or film for barrier, surface slip, heat-seal, gloss or abrasion protection, impregnation of paper for water-proofing and binding purposes, wax coating on appliances, automobiles, furniture, wood or composition flooring.

Dispersions of oils, waxes, resins, and inorganic particulate solid materials are useful in water-based protective coatings either by themselves or mixed with other dispersions. Other uses include adhesives, both for paper and textiles, pigment binders, nonwoven binders, sizes, waterproofing agents and fireproofing agents. These dispersions can be applied to both natural and synthetic textiles, e.g., textile fibers and woven and non-woven fabrics.

The following examples, in which all parts and percentages are by weight unless otherwise indicated, illustrate the invention.

EXAMPLE 1

This example illustrates the use of a polybasic fatty acid as the surface active agent for an ethylene/vinyl acetate copolymer dispersion.

Two hundred seventy (270) g. of an ethylene/vinyl acetate copolymer containing 25% copolymerized vinyl acetate and having a melt index of 2 ("Elvax" 360), together with 27 grams of dimer acid (Empol 1010, a product of Emery Industries, Inc. having a typical composition of 97% dimer acid and 3% trimer acid) was dissolved in a solvent mixture of 1717 g. of cyclohexane and 213 g. of n-propyl alcohol. The resulting solution was then added to a water phase of 1.9 g. of NaOH and 5.0 g. of 28% $NH_4OH$ in 940 grams of water and emulsified. This quantity of alkali metal hydroxide is sufficient to neutralize 35% of the acid groups of the dimer acid, the balance being converted to the ammonium salt.

Emulsification was carried out in a Model LBP Kady mill manufactured by the Kinetic Dispersion Corporation of Buffalo, N.Y. The mill was run for 5 minutes at 17,500 r.p.m. The emulsion was transferred to a one gallon steam jacketed agitated vessel and the solvents and part of the water evaporated at atmospheric pressure. Most of the solvents were removed as an azeotrope with water boiling at 67° C. Thereafter, the vapor temperature rose to about 100° C. and additional water was removed until the desired solids level was attained. The concentrated dispersion was cooled to 70° C. and 5 ml. of 28% $NH_4OH$ was added. The product contained 51% solids and had a viscosity of 1140 cps. as measured with a Brookfield Viscosimeter with a No. 3 spindle at 60 r.p.m. The dispersion showed no sign of coagulation when blended with an equal weight of a 30% solution of diammonium phosphate.

EXAMPLE 2

This example illustrates the use of a polybasic fatty acid as a surface active agent for a metallic oxide dispersion.

The following ingredients were added to an "Eppenbach Dispersor":

| | Parts by weight |
|---|---|
| Water | 22 |
| "Hydratex" clay (a hydrous aluminum silicate) | 5 |
| Tetrasodium pyrophosphate | 0.06 |
| Antimony trioxide | 50 |
| Ammonia | 2 |
| Trimer acid | 2 | and homogenized for 5 minutes. The temperature rose from room temperature to a range from about 50° C. to 80° C. The resulting dispersion had a solids content of 72% and was stable toward addition of diammonium phosphate. In fact, addition of 5% by weight of diammonium phosphate reduced the viscosity and improved the stability of the dispersion.

EXAMPLE 3

This example illustrates the use of the polybasic fatty acids of this invention to prepare stable dispersions of chlorinated paraffins.

Fifty (50) parts by weight of concentrated ammonium hydroxide were diluted with water to a total volume of 500 parts by weight. This solution was heated on a hot plate and fifty (50) parts of trimer acid were added slowly under vigorous mechanical stirring. The stirring was continued until all the trimer acid had dissolved and a homogeneous alkaline solution of the ammonium salt of trimer acid resulted. This solution was placed into a Kady mill and shearing was begun. Five hundred (500) parts of "Chlorowax" 500 (a chlorinated paraffin containing 60% chlorine, manufactured by Diamond Shamrock Corp. of Cleveland, Ohio) were added slowly to the sheared solution which increased viscosity during this operation. The shearing was continued for five (5) more minutes to insure a complete homogeneous dispersion.

The resulting storage-stable dispersion had a solids content of 48% and was not coagulated upon addition of 200 parts of a 10% aqueous solution of diammonium phosphate.

EXAMPLE 4

This example illustrates the use of dispersions prepared by the polybasic acids of this invention as a flame-retardant and water-repellent textile saturant.

Eighty-one (81) parts by weight of the dispersion of Example 2 was diluted with seventy (70) parts of water under vigorous mechanical stirring. To this dispersion were added eleven (11) parts of pigment (e.g., calcotone yellow, manufactured by American Cyanamid Co. of Bound Brook, N.J.), eighty-four (84) parts of the dispersion of Example 3, and twenty-five (25) parts of the dispersion of Example 1. The resulting blend of dispersions had a solids content of 42%, a pH of 11 and did not coagulate upon addition of twenty (20) parts of a 10% aqueous solution of diammonium phosphate. Addition of inorganic phosphates was important to reduce afterglow of impregnated textiles.

This dispersion bend was used to impregnate greige canvas to impart flame-retardance. At a total add-on of 35% by weight, the impregnated canvas was nonburning as determined in the vertical flame test described in ASTM D 626–SST.

I claim:

1. A storage-stable aqueous dispersion postdispersed under high energy mixing comprising as essential ingredients from about 0.5 to 50 weight percent, based on the total weight of essential ingredients, of a polymerized ethylenically unsaturated fatty acid as a surface active agent neutralized with a water-soluble base, and at least one water-dispersible ethylene copolymer which is essentially insoluble in water and comprises about 30 to 95 weight percent ethylene and about 70 to 5 weight percent of at least one comonomer having polar characteristics, which copolymer was polymerized prior to contacting said surface active agent and is a liquid, or a liquid solution, having a viscosity below 5,000 centipoises at a temperature at which the dispersion is formed.

2. The dispersion of claim 1 wherein said water-soluble base is at least one water-soluble base selected from the group consisting of an alkali metal base and an ammonium base and said polybasic ethylenically unsaturated fatty acid neutralized with alkali metal base is present in an amount of at least 0.5 weight percent, based on the total weight of essential ingredients.

3. The dispersion of claim 1 wherein said polybasic ethylenically unsaturated fatty acid is a polymerized $C_{16}$ to $C_{18}$ fatty acid monomer.

4. The dispersion of claim 3 wherein said fatty acid monomer is selected from the group consisting of oleic, linoleic, linolenic, and ricinoleic acid.

5. The dispersion of claim 4 wherein said fatty acid is a dimerized or trimerized fatty acid and is present in the dispersion in an amount of 1 to 30 weight percent.

6. The dispersion of claim 1 further comprising at least one polyvalent inorganic anion selected from the group consisting of inorganic phosphates and borates.

7. An aqueous dispersion postdispersed under high-energy mixing comprising as essential ingredients from about 1 to 30 weight percent, based on the total weight of essential ingredients, of a dimerized or trimerized ethylenically unsaturated fatty acid neutralized with at least one water-soluble base selected from the group consisting of an alkali metal base and an ammonium base, with said fatty acid neutralized with base present in an amount of at least 0.5 weight percent, based on the total weight of essential ingredients, and at least one water-dispersible ethylene copolymer which is essentially insoluble in water and comprises about 30 to 95 weight percent ethylene and about 70 to 5 weight percent of at least one comonomer having polar characteristics, which copolymer was polymerized prior to contacting said dimerized or trimerized ethylenically unsaturated fatty acid, and is a liquid, or a liquid solution, having a viscosity below 5,000 centipoises at a temperature at which the dispersion is formed.

8. A process for preparing an aqueous dispersion comprising agitating under high-energy in water at least one dispersible material which is essentially insoluble in water and is a resin which is a liquid having a viscosity below 5,000 cps. at the temperature at which the dispersion is formed, in the presence of from about 0.5 to 50 weight percent, based on the total weight of said dispersible material, of a polymerized ethylenically unsaturated fatty acid as a surface active agent neutralized with a water-soluble base.

9. The process of claim 8 wherein said polymerized ethylenically unsaturated fatty acid is a dimerized or trimerized fatty acid selected from the group consisting of oleic, linoleic, linolenic, and ricinoleic acid and said water-soluble base is at least one water-soluble base selected from the group consisting of alkali metal base and ammonium base.

10. The process of claim 8 wherein said dispersible material is dissolved in a water-immiscible organic solvent and the dispersing temperature is between about 50 and 80° C. at atmospheric pressure.

11. The process of claim 8 wherein the water-immiscible organic solvent is a solvent mixture comprising a hydrocarbon solvent and a polar liquid.

References Cited
UNITED STATES PATENTS

| | | | |
|---|---|---|---|
| 2,313,144 | 3/1943 | Gomm | 260—29.6 X |
| 2,876,203 | 3/1959 | Miller et al. | 260—23 X |
| 2,653,919 | 9/1953 | Hunter | 260—23 |
| 3,257,377 | 6/1966 | Hannel et al. | 260—23.7 X |
| 3,480,578 | 11/1969 | Witt | 260—23.7 |

DONALD E. CZAJA, Primary Examiner

E. C. RZUCIDLO, Assistant Examiner

U.S. Cl. X.R.

260—23 R, 23 H, 23.7 A, 29.6 PM